US006314621B1

(12) United States Patent
Kawahara

(10) Patent No.: US 6,314,621 B1
(45) Date of Patent: Nov. 13, 2001

(54) TAPE-MOUNTED FASTENER AND A MANUFACTURING METHOD THEREOF

(75) Inventor: Masahiko Kawahara, Mino (JP)

(73) Assignee: Morito Co., Ltd., Osaka (JP)

( * ) Notice: Subject to any disclaimer, the term of this patent is extended or adjusted under 35 U.S.C. 154(b) by 0 days.

(21) Appl. No.: 09/491,099

(22) Filed: Jan. 25, 2000

(30) Foreign Application Priority Data

Sep. 17, 1999 (JP) ........ 11-263827
Dec. 27, 1999 (JP) ........ 11-368614

(51) Int. Cl.[7] ........ A44B 17/00

(52) U.S. Cl. ........ 24/114.4; 24/662; 24/114.6

(58) Field of Search ........ 24/662, 692, 693, 24/114.4, 114.12, 114.6, 108, 104, 107, 90.1, 93, 94; 265/23, 445; 156/66, 580.1

(56) References Cited

U.S. PATENT DOCUMENTS 3,206,818 * 9/1965 Knowlton ........ 24/114.4 X
3,378,893 * 4/1968 Labek ........ 24/662
3,650,647 * 3/1972 Jacobs et al. ........ 24/114.6 X
3,800,368 * 4/1974 Simon ........ 24/693
3,878,588 * 4/1975 Soto ........ 24/662
3,890,679 * 6/1975 Simon ........ 24/693 X
4,735,753 * 4/1988 Ackermann ........ 264/23
5,357,659 10/1994 Ackermann .

FOREIGN PATENT DOCUMENTS 228 293 7/1990 (EP) .
10-33211 2/1998 (JP) .

* cited by examiner

*Primary Examiner*—Robert J. Sandy
(74) *Attorney, Agent, or Firm*—Merchant & Gould P.C.

(57) ABSTRACT

A tape-mounted fastener comprising a male tape and a female tape in which the male tape is made of a cloth tape (18) onto which several resin male parts (6) are molded and fastened at certain intervals and a female tape is made of a cloth tape (30) onto which several resin female parts (6) are molded and fastened at the same intervals as said male parts with no mounting holes pierced on either of said cloth tapes. The engagement protrusions (20) of the male parts (6) stand upright directly from the cloth tape (30) without the aid of a base. The male and female parts preferably have a ring-shaped appearance when viewed from either the front or the back.

10 Claims, 7 Drawing Sheets

20a
40
6A

2

PRIOR ART

TAPE-MOUNTED FASTENER AND A MANUFACTURING METHOD THEREOF

FIELD OF THE INVENTION

The present invention relates to a tape-mounted fastener made of synthetic resin usable in the openings of clothing, bags, shoes, etc., and to a manufacturing method thereof.

BACKGROUND OF THE INVENTION

Generally a tape-mounted fastener comprises a male tape consisting of several synthetic resin male parts molded and fastened onto a cloth tape at certain intervals and a female tape consisting of several synthetic resin female parts molded and fastened onto a cloth tape at the same intervals as the male parts (e.g., EP0228293B2 by the present applicant).

While the above tape-mounted fastener has mounting holes established on cloth tapes, a tape-mounted fastener comprising male parts and female parts firmly molded and fastened without mounting holes pierced on cloth tapes is also known (e.g., JP-A-10-33211 by the present applicant).

SUMMARY OF THE INVENTION

The present invention is an improvement on the latter invention, and in particular, in respect of the male parts. The first objective of the present invention is to reduce the thickness of the entire fastener by lowering the height of the engagement protrusion of the male parts without detriment to their strength.

The second objective of the present invention is to reduce the size of the male parts without detriment to their strength.

The third objective of the present invention is to make the junction of the cloth tapes and the synthetic resin of the male and female parts more stable, thereby preventing the cloth from emerging from the synthetic resin of the male and female parts or the cloth from bending or undulating as a result of the injection pressure.

The tape-mounted fastener of the present invention comprises a male tape and a female tape in which the male tape is made of a cloth tape on which several resin male parts are molded and fastened at certain intervals and the female tape is made of a cloth tape on which several resin female parts are molded and fastened at the same intervals as said male parts with no mounting holes pierced on either of said cloth tapes, characterized in that the engagement protrusions of the male parts stand upright directly from the cloth tape without the aid of a base.

The manufacturing method of the tape-mounted fastener of the present invention relates to the tape-mounted fastener comprising a male tape and a female tape in which the male tape is made of a cloth tape on which several resin male parts are molded and fastened at certain intervals and the female tape is made of a cloth tape on which several resin female parts are molded and fastened at the same intervals as said male parts with no mounting holes pierced on either of said cloth tapes, and its characteristics with respect to the male parts and the female parts are as described below.

In order to mould the male part, a non-porous cloth tape having a coarse texture that allows the percolation of molten resin under a molding pressure is provided between the upper and lower dies forming a space for molding the fastener, and the cloth tape at the dents positioned inside the engagement protrusions of the male parts is sandwiched and fastened by said upper and lower dies, after which synthetic resin is injected into the space for molding so that the front side and the back side of the male parts formed on either side of the cloth tape are integrated by the synthetic resin percolating through the cloth tape.

In order to mould the female parts, a non-porous cloth tape having a coarse texture that allows the percolation of molten resin under a molding pressure is provided between the upper and lower dies forming a space for molding the fastener, and the cloth tape at the engagement dents of the female parts is sandwiched and fastened by said upper and lower dies, after which synthetic resin is injected into the space for molding so that the front side and the back side of the female parts formed on either side of the cloth tape are integrated by the synthetic resin percolating through the cloth tape.

In the tape-mounted fastener of the present invention, the male parts have no base. Accordingly it is preferable that the engagement protrusions have a somewhat greater thickness than those of the prior art.

The male parts and the female parts should preferably have a ring shape when viewed from the front or from the back. However, the interior profile of the male parts and the exterior profile of the female parts, which have no relevance to the engagement, may be freely designed from an aesthetic point of view.

According to the tape-mounted fastener of the present invention, the engagement edge of either the male parts or the female parts may be polygonal.

The bulging edges for engagement are preferably formed on both the outside and inside of the tip of the engagement protrusions of the male parts. With this design, the male parts can also function as female parts in that the inside bulging edges of the male parts can engage with the outside bulging edges of another group of male parts.

According to the present invention, the height of the engagement protrusions of the male parts can be made lower by as much as the height of the base of the prior art, resulting in a smaller overall thickness of the fastener without detriment to its strength.

Because there is no base, the size of the male parts can also be made smaller without detriment to the fastener's strength.

Because the central dents of both the male and female parts are sandwiched and fastened by the upper and lower dies during the molding process, the injection pressure is applied to only a small area, boosting the stability of the junction between the cloth tape and the synthetic resin of the male parts. As a result, the cloth does not emerge from the synthetic resin of the male and female parts.

DESCRIPTION OF THE DRAWINGS

Examples of the present invention will now be described with reference to the accompanying drawings in which:

FIG. 1(*a*) is the female part 4 side, and FIG. 1(*b*) is the male part 6 side;

DESCRIPTION OF THE PREFERRED EMBODIMENTS

Figure 1A:
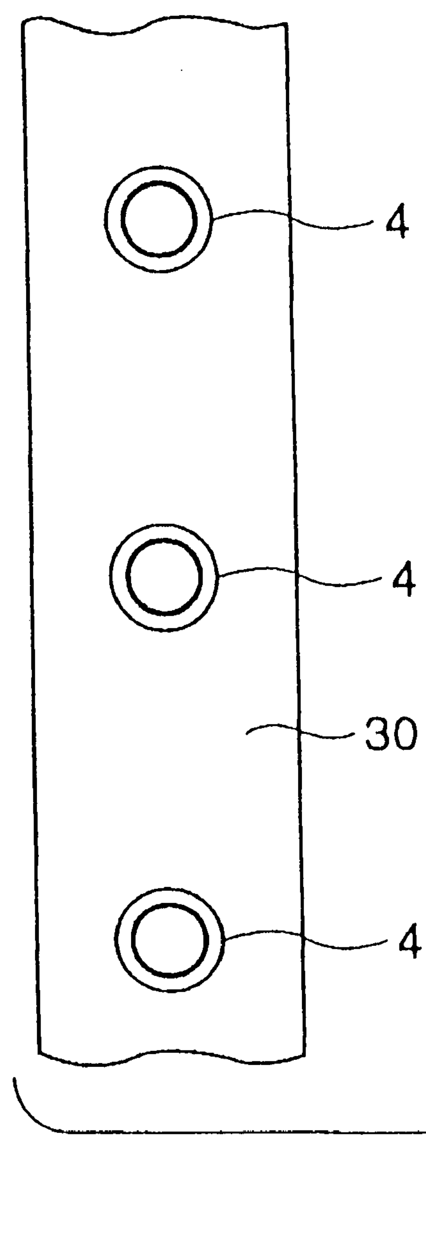
FIG. 1(*a*) and FIG. 1(*b*) are plan views of the tape-mounted fastener 2 of the present invention as viewed from the junction side.
Figure 1B:
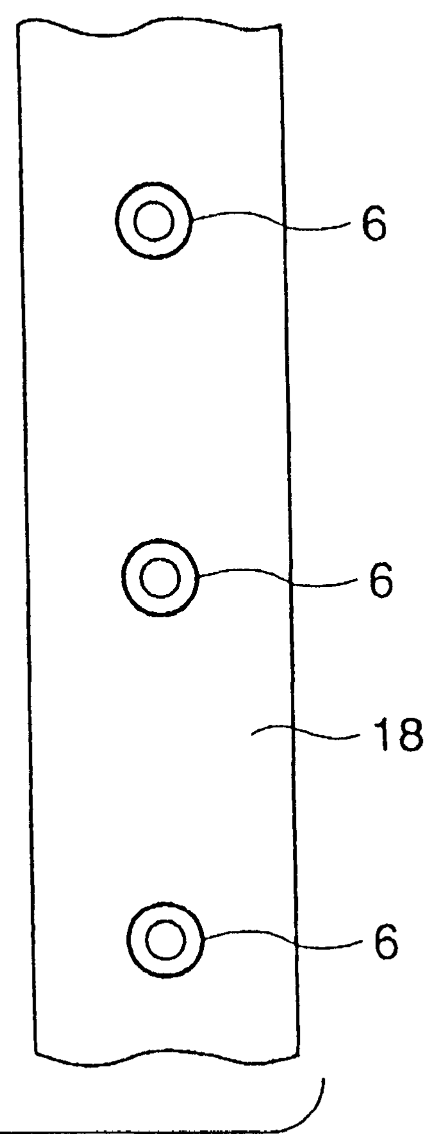

FIG. 1 is a plan view of a tape-mounted fastener 2 of the present invention viewed from the junction side: (a) is the side for male parts 4 and (b) is the side for female parts 6. Both the male parts and the female parts have near ring shapes. Although the other sides of the male and female parts are not shown, they both have ring shapes. The rings on the other sides, however, are somewhat larger for reasons relating to molding as will be explained later.

Figure 2:
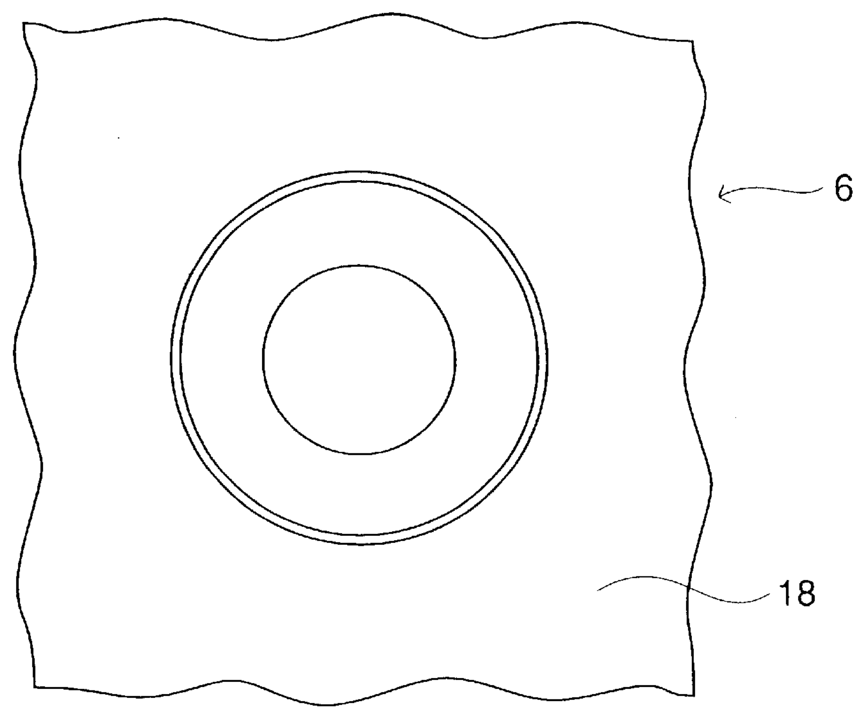
FIG. 2 is a plan view of a male part 6 of the present invention.
Figure 3:
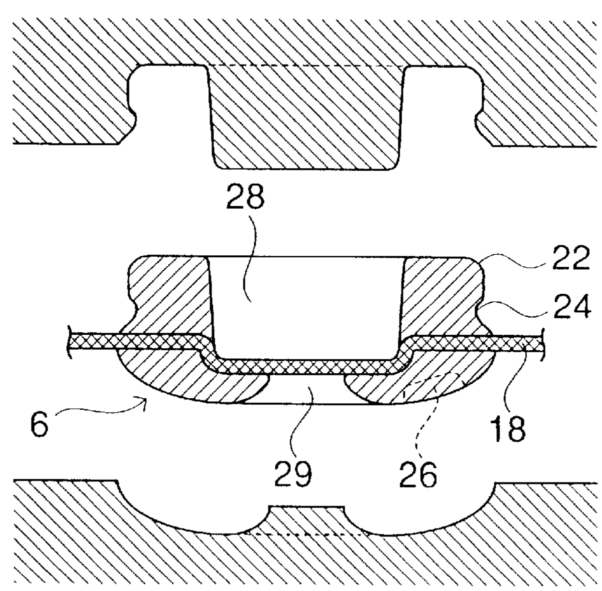
FIG. 3 is a cross sectional view of a male part 6 of the present invention.
Figure 9:
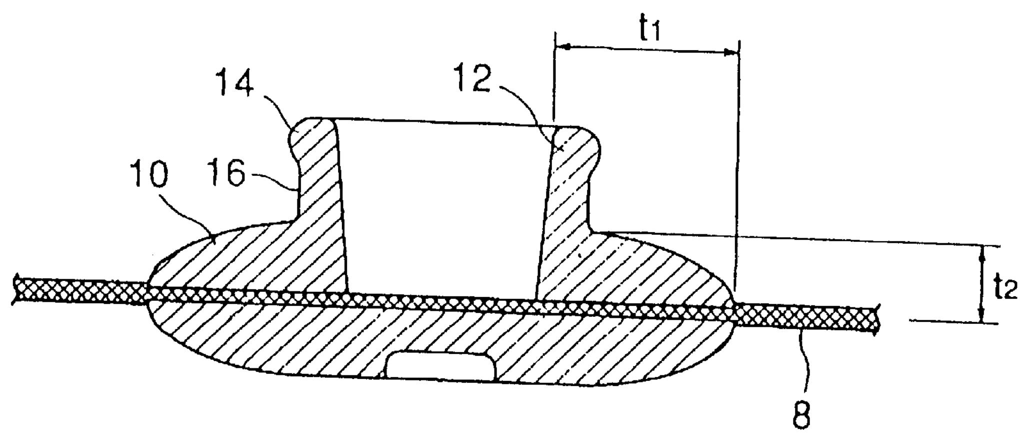
FIG. 9 is a cross sectional view of a conventional male part.

FIG. 2 is a plan view and FIG. 3 is a cross sectional view of a male part 6. As mentioned earlier, the present invention is an improvement on the prior art with respect to this part. According to the prior art, as shown in FIG. 9, an engagement protrusion 12 stands upright from a base 10 that sandwiches a cloth tape 8. The engagement protrusion 12 of the male part has a bulging edge 14 for engagement around its tip and a concave part 16 to allow for expansion or shrinkage induced deformation of the elastic resin.

According to the present invention, as shown in FIG. 3, there is virtually no base. In this drawing, the part that adheres to the cloth tape 18 bulges slightly, but this level of bulging is not considered a base. It is also possible to design a male part that is completely free of such bulging. Because there is no base, the engagement protrusion 20 can be made shorter by the distance $t_2$ in FIG. 9. In the present invention, the cross section of the engagement protrusion 20 is formed thicker than in the prior art, but it is still less than the cross sectional width $t_1$ of the prior art having the base 10. As a result, it is possible to reduce the overall size of the male part 6 without changing the size of the engagement part.

The engagement protrusion 20 of the male part also has a bulging edge 22 for engagement around its tip and a concave part 24 to allow for expansion and shrinkage of the elastic resin.

To form this male part 6, a non-porous cloth tape 18 having a coarse texture that allows the percolation of molten resin under a molding pressure is provided between the upper and lower dies forming a space for molding the fastener, and the cloth tape between an upper dent 28 and a lower dent 29 of the male part 6 is sandwiched and fastened by said upper and lower dies, after which synthetic resin is injected into the space for molding. In FIG. 3, the small dent indicated by numeral 26 corresponds to the injection port of the die. Because of this injection port, the width of the ring viewed from the back side is slightly larger than the width of the engagement protrusion 20 (i.e., the width of the ring viewed from the front side).

In this way, the front side and the back side of the male parts formed on either side of the cloth tape 18 are integrated by the synthetic resin percolating through the cloth tape 18. In the present invention, as described above, because the cloth tape positioned between the upper dent 28 and the lower dent 29 is sandwiched and fastened by the upper and lower dies, the area on the cloth tape that is subjected to the high injection pressure is smaller than in the prior art. Therefore, the tape rarely bends or undulates when the male parts are molded. As a result, it is possible to avoid the situation in which the tape emerges from the surface of the synthetic resin, an occurrence that tends to lessen the strength and spoil the appearance of the fastener.

The tape cloth 18 needs to be such that it allows the percolation of molten resin without being melted itself Either a woven or knitted cloth, such as a cotton or blended yarn cloth can be used. For the synthetic resin, thermoplastic resin, for example, polyacetal molten resin can be used.

Figure 4:
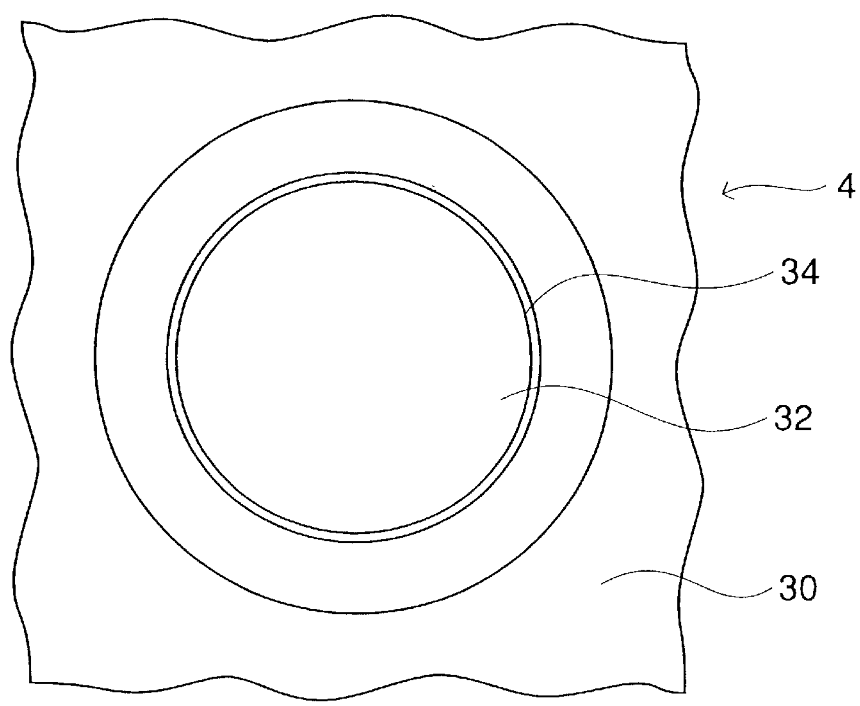
FIG. 4 is a plan view of a female part 4.
Figure 5:
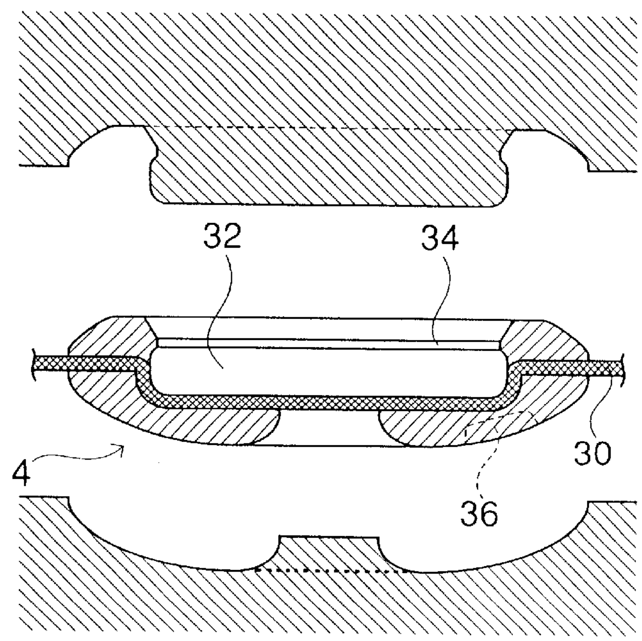
FIG. 5 is a cross sectional view of a female part 4.

FIG. 4 is a plan view and FIG. 5 is a cross sectional view of a female part 4. An engagement dent 32 is formed by synthetic resin on the cloth tape 30. On the inside of the opening of the engagement dent 32 of the female part, an edge 34 that allows engagement is formed.

The method for moulding this female part is virtually the same as that for the male part 6. Accordingly, a detailed explanation thereof will be skipped. The small dent indicated by code 36 in FIG. 5 is the inlet through which resin is injected.

Figure 6:
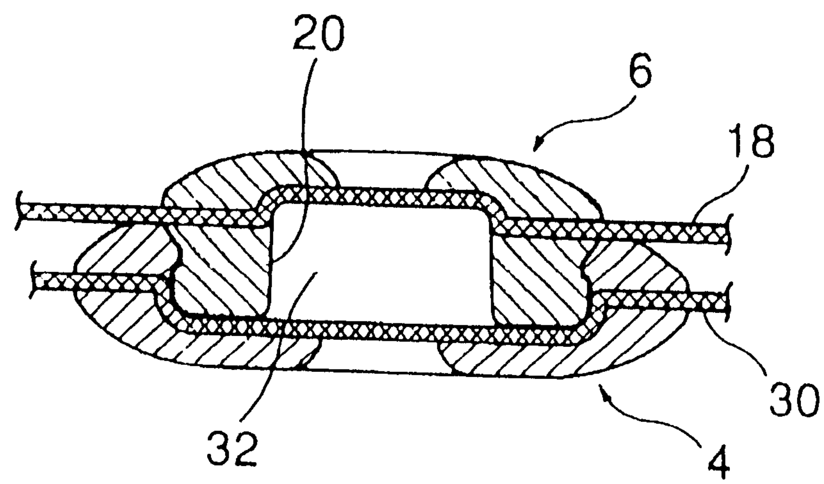
FIG. 6 is a cross sectional view showing the condition in which a male part 6 and a female part 4 of the present invention are engaged.

FIG. 6 shows a cross section of a male part 6 and a female part 4 of the present invention as they are engaged. The fastener of the present invention is used in the same way as conventional fasteners.

Figure 7:
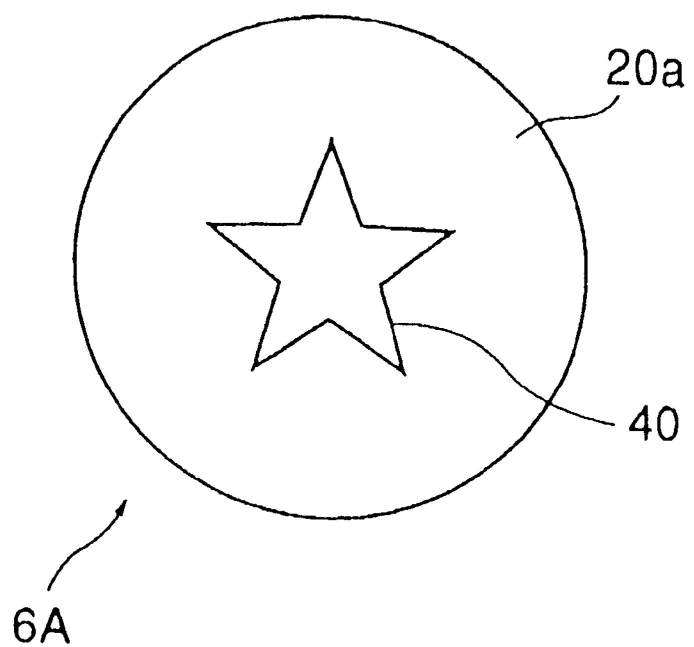
FIG. 7 is a plan view of a male part 6A according to the second example of the present invention as viewed from the junction side.

FIG. 7 is a plan view of a male part 6A according to the second example of the present invention as viewed from the junction side. Because the inside 40 of the male part has no relevance to the engagement, it may be of any shape, e.g., a star shape as shown in FIG. 7. Any shape can be chosen from an aesthetic point of view. Numeral 20*a* is an engagement protrusion.

Figure 8:
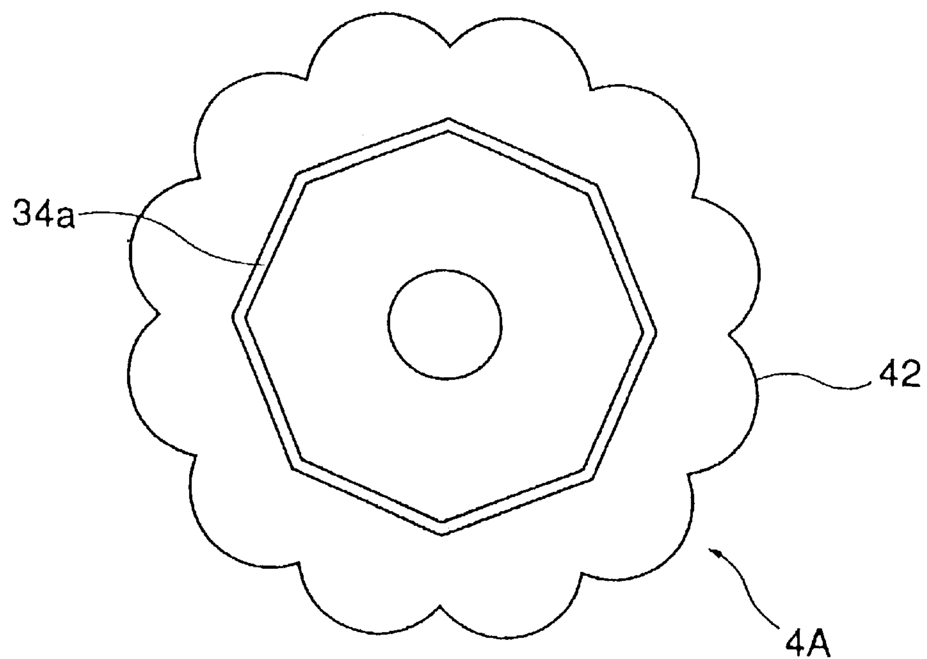
FIG. 8 is a plan view of a female part 4A according to the third examples of the present invention as viewed from the junction side.

FIG. 8 is a plan view of a female part 4A according to the third example of the present invention as viewed from the junction side. Because the outside profile 42 of the female part 4A has no relevance to the engagement, it may be of any shape, e.g., a flower shape as shown in FIG. 8. Any shape can be chosen from an aesthetic point of view.

In FIG. 8, the engagement edge 34*a* is polygonal (octagonal in FIG. 8). This female part can be engaged with a male part having a circular engagement edge to obtain a stronger engagement force than in the case of engaging a male part and a female part both having circular engagement edges. Although not shown in the drawings, a combination of a male part with a polygonal engagement edge and a female part with a circular engagement edge is also possible.

Figure 10:
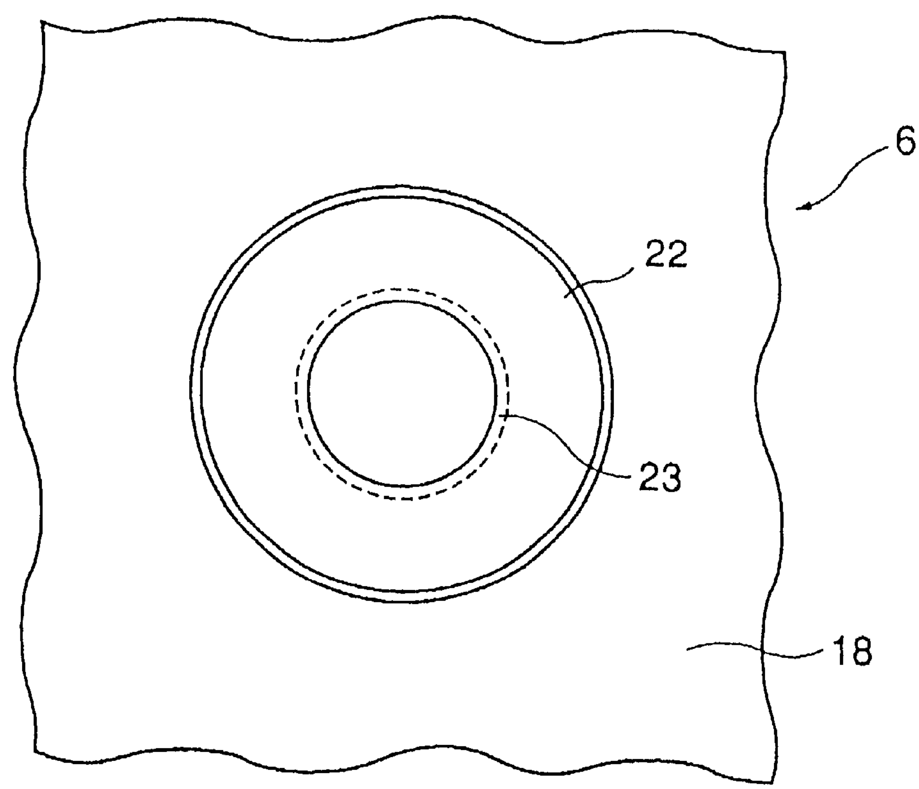
FIG. 10 is a plan view of a male part of the fourth example.
Figure 11:
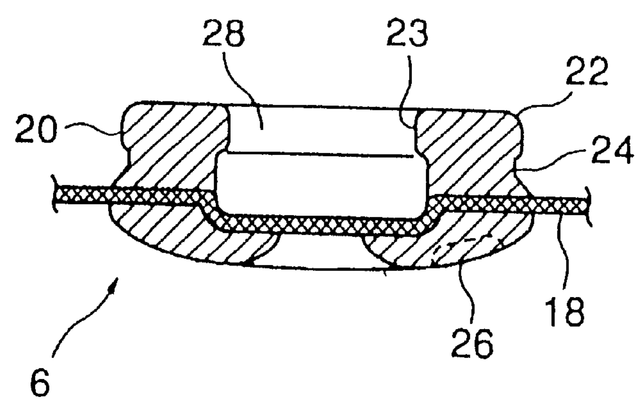
FIG. 11 is a cross sectional view of a male part of the fourth example.

FIGS. 10 and 11 are a plan view and a cross sectional view respectively of a male part according to the fourth example of the present invention. This male part is different from that of the first example in that the engagement protrusion 20 has at its tip not only an outside bulging edge 22 but also an inside bulging edge 23.

Figure 12A:
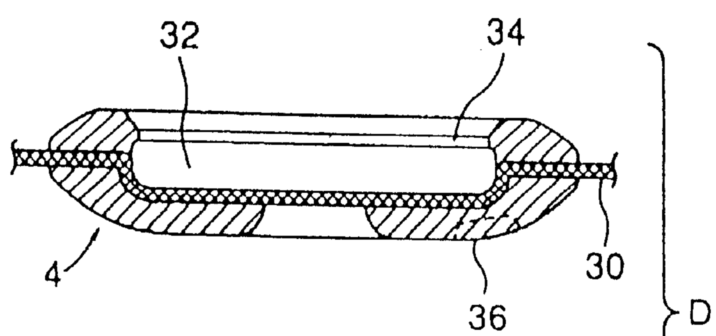
FIGS. 12*a*–12*e* are cross-sections of the components of the first and fourth examples showing their respective relations.
Figure 12B:
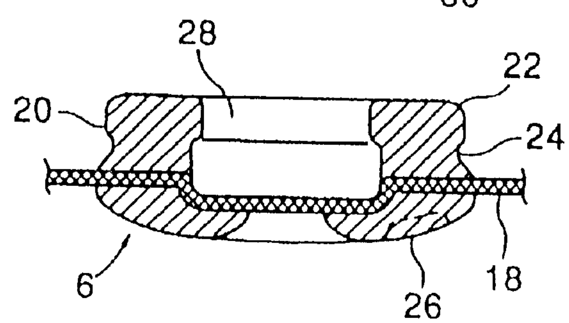
Figure 12C:
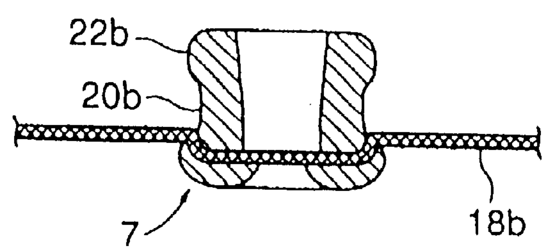
Figure 12D:
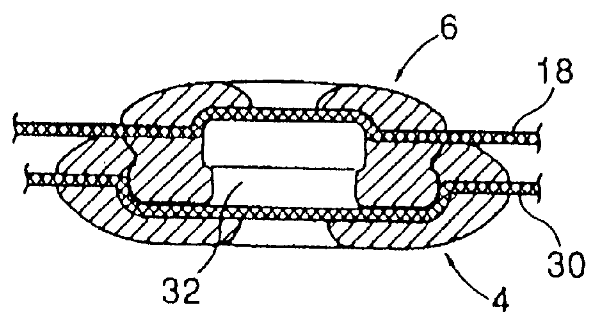
Figure 12E:
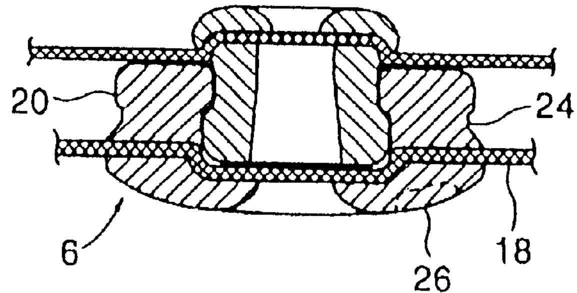

By adding an inside bulging edge 23, this male part can also function as a female part, when it is used with another male part 7 FIG. 12*c*, by receiving the outside bulging edge 22*b* of the engagement protrusion 20*b* of the male part 7. As shown in FIG. 12*d* and explained earlier, the female part A and the male part B (shown in FIGS. 12*a* and 12*b*) engage with each other to form an engagement condition D. Moreover, the male part B can engage with another male part C to form another engagement condition E (shown in FIG. 12*e*).

Normally, in order to provide two types of fasteners of different sizes, four types of parts (i.e., two types each of male and female parts) are necessary. With the construction of the fourth example, only three types of parts (i.e., one type of male part and two types of female parts) are necessary. Because a fewer number of parts are required, the number of dies can also be reduced, and less labor is required for manufacturing. Product control is also simplified. Moreover, it is possible for tapes provided with parts A, B and C of FIGS. 12*a*–12*c* to be arranged parallel at the same time and engaged selectively. In other words, at times B is engaged with A, whereas at other times B is engaged with C, turning over the sheet of B to face with C. Such a construction can be used to selectively open or close the inner partitions of a bag.

What is claimed is:

1. A tape-mounted fastener comprising:

a male tape made of a cloth tape on which several resin male parts are molded and fastened at certain intervals with no mounting holes pierced on said male cloth tape, said male parts each having an engagement protrusion, said male parts each having an exposed cloth at its center when viewed from either front or back; and a female tape made of a cloth tape on which several resin female parts are molded and fastened at the same intervals as said male parts with no mounting holes pierced on said female cloth tape, said female parts each having an exposed cloth at its center when viewed from either front or back.

2. A tape-mounted fastener according to claim 1 wherein the male part has a ring-shaped appearance when viewed from either the front or the back.

3. A tape-mounted fastener according to claim 1 wherein the interior profile of the engagement protrusions of the male parts is of a shape other than a circle.

4. A tape-mounted fastener according to claim 1, wherein the female parts have a ring-shaped appearance when viewed from either the front or the back.

5. A tape-mounted fastener according to claim 1, wherein the exterior profile of engagement protrusions of the female parts is of a shape other than a circle.

6. A tape-mounted fastener according to claim 1, wherein bulging edges for engagement are formed on both the outside and inside of the tip of the engagement protrusions of the male parts.

7. A tape-mounted fastener according to claim 6 wherein the inside bulging edges of the male parts can engage with the engagement protrusions of another group of male parts.

8. A method for manufacturing a tape-mounted fastener comprising a male tape and a female tape in which the male tape is made of a cloth tape on which several resin male parts are molded and fastened at certain intervals with no mounting holes pierced on said cloth tape, said male parts each having an exposed cloth at its center when viewed from either front or back and the female tape is made of a cloth tape on which several resin female parts are molded and fastened at the same intervals as said male parts with no mounting holes pierced on either of said cloth tapes, said method comprising the steps of: providing a cloth tape having a coarse texture that allows permeation of molten resin under a molding pressure between upper and lower dies forming a space for molding the fastener;

sandwiching and fastening the cloth tape at dents positioned inside engagement protrusions of the male parts directly by said upper and lower dies; and injecting synthetic resin into the space for molding so that the front side and the back side of the male parts formed on either side of the cloth tape are integrated by the synthetic resin permeating through the cloth tape.

9. A method for manufacturing a tape-mounted fastener comprising a male tape and a female tape in which the male tape is made of a cloth tape on which several resin male parts are molded and fastened at certain intervals and the female tape is made of a cloth tape on which several resin female parts are molded and fastened at the same intervals as said male parts with no mounting holes pierced on either of said cloth tapes, said female parts each having an exposed cloth at its center when viewed from either front or back, wherein said method comprises the steps of:

providing a cloth tape having a coarse texture that allows permeation of molten resin under a molding pressure between upper and lower dies forming a space for molding the fastener;

sandwiching and fastening the cloth tape at engagement dents of the female parts by said upper and lower dies;

and injecting synthetic resin into the space for molding so that the front side and the back side of the male parts formed on either side of the cloth tape are integrated by the synthetic resin permeating through the cloth tape.

10. A tape mounted fastener according to claim 1, wherein an engagement edge of the exterior profile of said female parts is polygonal.

* * * * *